Patented May 15, 1923.

1,455,307

UNITED STATES PATENT OFFICE.

HAROLD A. SOULIS AND WILBUR T. SOULIS, OF NEW YORK, N. Y.

PROCESS OF UNITING METALS.

No Drawing.      Application filed August 27, 1919. Serial No. 320,223.

*To all whom it may concern:*

Be it known that we, HAROLD A. SOULIS and WILBUR T. SOULIS, citizens of the United States, residing at New York, in the county and State of New York, have invented certain new and useful Improvements in Processes of Uniting Metals, of which the following is a specification.

The present invention relates to a process of uniting metals and more especially to effecting the joinder or union of structural parts of metals possessing different inherent characteristics or qualities, such for instance as steel and cast iron, or drawn steel and drop forgings.

It is well known in the art that various structures, especially in automotive engineering, which are now produced of a single metal could be more economically manufactured and would be better adapted to perform their specific functions if they were built up of a combination of metals of different degrees of hardness, such for instance, as steel and cast iron.

Many attempts have been made to take advantage of the combination of such metals without success owing to the impossibility of uniting the metals with any degree of permanency, particularly where structures of which the unlike metal parts were components were subject to varying or alternating stresses, or where they were employed in rapidly fluctuating and high temperatures.

In those isolated instances where the employment of unlike metal parts has been resorted to, the joinder has generally been effected by well known processes such as surface brazing or one of the several forms of welding or the like. The joints made by any of these processes, however, are clearly not of a character which will provide a structure possessing the strength and durability of a homogeneous one. For instance, in surface brazing and the several forms of welding, except spot welding, the edges only of the contacting parts of the structure are united, the central areas of those surfaces remaining unjoined. On the other hand, in spot welding, the joinder is made only at spaced points on the opposite surfaces of the parts so that in no case where any of the known processes are employed can the entire contacting or opposing surfaces of the parts of unlike metals be united. This will be evident when it is considered that the structural parts to be united may be of an intricate design embodying curved or irregular surfaces located a considerable distance inwardly of the exposed edges of the parts and which are, therefore, inaccessible in practicing the forms of welding or brazing previously referred to. Obviously, to obtain a complete joinder of the structural parts every portion of the opposed surfaces, including the aforesaid inaccessible points, must be united. We have found in actual practice that the use of the former methods of brazing or welding in uniting structural parts of unlike metals does not produce a structure which possesses the homogeneity and durability of a structure in which the components are united in a manner whereby the entire opposing surfaces are joined. Manifestly, a structure in which the parts are completely united is stronger and more efficient than one in which only portions of such parts are joined and, in order to obtain all of the advantages of an integral structure, we have found it absolutely essential that every portion, however inaccessible, of the opposing surfaces of the structural parts must be united.

The primary object of our invention therefore, is to provide a method of uniting structural components of like and unlike metals whereby a complete union or joinder of the parts will be effected and a strong durable and resistant structure obtained.

Our invention further contemplates a method as aforesaid which may be economically practiced and by means of which the qualities specific to each metal may be retained and the composite structure will embody advantages which were heretofore unattainable in structures made of metal alloys or those built up or formed of like metals. Manifestly this will materially increase the scope of usefulness of devices of various types and will permit of the production of others which it has previously been impracticable to manufacture or build of metal.

Our invention also comprehends a method of effecting the union or joinder of like and unlike metal parts of structures for various purposes wherein the metals are united in such a manner as to substantially encompass an amalgamation or molecular union of the contacting surfaces of the parts. By this method of joining the components the equivalent of a homogeneous structure is obtained which embodies all of its desirable attributes, the joints possessing extremely high points of resistivity to heat and strains.

Another object of our invention is to unite like and unlike metal structural parts by a method involving the employment of a non-corrosive composition which further adds to the life of structures made in accordance with our invention.

Other objects and advantages residing in the practicing of our invention will become manifest as the description proceeds and we would have it understood that we reserve unto ourselves all rights to which we may be entitled in the way of modifications and equivalents, both in the constituents and practicing of the process and the uses to which it may be applied.

In order to afford a clear and comprehensive understanding of our invention, we shall proceed to describe the practicing of our process in uniting steel and cast iron. These two metals possess inherently different qualities and in selecting them, we would have it understood that our process is equally efficacious in joining pressed or drawn steel with drop forgings and other relatively different metals, as well as like metals, ad infinitum.

Assuming that a structure is to be produced which embodies parts formed of steel and cast iron, a composition is prepared in which copper, tin and zinc are present in the proportions necessary to meet the requirements of the particular work. The composition is then heated to the melting point of 2050° F., in a suitable crucible or vessel, this initial temperature of the bath being maintained during the practicing of the process. We have found that a furnace of the oil type, owing to the ease with which the heat generated may be controlled, affords a most satisfactory means of heating the spelter bath. When the bath has been heated to the aforesaid temperature, it is then ready for the reception of the structural parts which are to be integrally joined thereby. These parts which have been previously shaped and fitted are pinned or connected together by means of rivets, spot welds or the like to render them relatively immovable during the carrying out of the remaining steps of the process. The connected parts are then treated with a suitable flux to cleanse the surfaces thereof after which they are dipped or immersed in the heated bath to effect a complete union of the entire contacting surfaces.

This result will be readily perceived when it is considered that the melting point of the steel parts is 2600° F., while that of the iron is 2200° F., the iron becoming soft at 2050° F. which is the temperature at which the bath is constantly maintained. The steel parts at this same temperature become white hot so that the spelter in which the parts are immersed enters the expanded pores of the iron resulting in a coalescence of the molecules of the spelter and iron to a considerable depth, and adheres firmly to the surface of the steel. The spelter by reason of being maintained at a constant temperature as above stated, will flow into an opening of only a few thousandths of an inch and penetrate into all the crevices and irregularities in the opposing surfaces of the parts. As the structural parts are heated in their immersion in the bath, expansion takes place and microscopic pores and seams open up over their entire surfaces, the spelter by capillary attraction, penetrating into the pores to a depth of one to two thousandths of an inch. By this means a molecular union of the metals is virtually effected between every portion of the opposed surfaces of the structural parts, irrespective of their inaccessibility under the ordinary forms of brazing and welding. Following the immersion, the work is withdrawn from the bath and the spelter drained therefrom over the crucible after which the structure is permitted to cool.

In some instances, in practicing our invention it is desirable to pre-heat the metal parts before subjecting them to immersion, the necessity for this depending largely upon the use to which the completed structure is to be put. For example, where the unlike metals are of different gauges or thickness, as where a shell of light gauge steel has attached thereto a relatively heavy member of cast iron, the preheating is effected by direct application of the heating agent to the heavier metal, the lighter metal being brought to the requisite temperature by the heat transmitted thereto from the former, or if desired, different degrees of heat may be simultaneously applied to both metals, either of these methods serving to produce a substantially uniform temperature throughout the united parts preparatory to immersion in the metallic bath. On the other hand, where the two metals are of approximately the same gauge, the preheating may be effected in the usual manner, as by placing in a furnace or by other well known means. Furthermore the bath may be made up of a composition of copper, zinc, tin, aluminum or nickel mixed in the proportions and combinations desired to meet the requirements of particular classes of work. As an example, where the completed structure must possess stress resistances, as in a connecting rod for internal combustion engines, a high melting alloy is used, the critical dipping or immersion temperature being slightly below the melting point of the softer metal. In this instance, the work is pre-heated as previously explained.

While we have described our invention with reference to the treatment of certain metals, steel and cast iron, and have set forth specific ingredients of the bath and the temperature at which it functions to unite those metals, it is evident that our invention is not limited to a process for uniting those particular metals, but is susceptible to use in uniting like and unlike metals of various degrees of hardness by changing the composition of the bath and the critical or coalescing temperature thereof.

Further, it will be manifest that by practicing our invention as generally described the structural components are united or joined by what is substantially a molecular amalgamation of the spelter and the softer metal, the former fusing to the surface of the harder metal and interlocking with the softer metal and providing a product which it has heretofore been impossible to obtain by any of the methods known and practiced in the arts.

We claim:

1. The process of uniting structural parts of unlike metals having relatively different melting points, consisting in relatively locating the parts and then immersing them in a metallic bath having a substantially constant temperature maintained slightly below the lowest melting point of the metals.

2. The process of uniting structural parts formed of metals having relatively different melting points, consisting in relatively locating the parts and then immersing them in a metallic bath maintained at a temperature slightly below the melting point of the metal having the lower melting point, whereby a coalescence of the bath material and the metals will be effected.

3. The process of uniting structural parts formed of relatively hard and soft ferrous metals consisting in relatively locating the parts and then immersing them in a metallic bath heated to a temperature just below the melting point of the softer metal, whereby the harder metal will become white hot and the bath material will firmly adhere to the surface thereof, and a coalescence of the molecules of the bath material and the softer metal will be effected.

4. The process of uniting structural parts formed of relatively hard and soft metals having different melting points, which consists in relatively locating the parts, then immersing them in a metallic bath heated to a temperature slightly below the lowest melting point of the metals, whereby the harder metal will become white hot and the bath material will firmly adhere to the surface thereof, and a coalescence of the molecules of the bath material and the softer metal will be effected, and then draining the bath material from the work and permitting the work to cool.

5. The process of uniting structural parts of unlike metals having relatively different melting points, consisting in relatively locating the parts, preheating them to obtain a substantially uniform temperature throughout said parts and then immersing them in a metallic bath having a substantially constant temperature maintained slightly below the lowest melting point of the metals.

6. The process of uniting structural parts formed of metals having relatively different melting points which consists in relatively locating the parts, treating them with a flux, then immersing them in a metallic bath heated to a temperature just below the lowest melting point of the metals, whereby the metal of the relatively higher melting point will become white hot and the bath material will be caused to firmly adhere to the surface thereof, a molecular union being effected between the material of the bath and the metal of the lowest melting point.

7. The process of uniting structural parts formed of relatively hard and soft ferrous metals consisting in relatively locating the parts, preheating the same to a substantially uniform temperature and then immersing them in a metallic bath heated to a temperature just below the melting point of the softer metal, whereby the harder metal will become white hot and the bath material will firmly adhere to the surface thereof, and a coalescence of the molecules of the bath material and the softer metal will be effected.

8. A step in the process of uniting structural parts formed of metals of different degrees of hardness, consisting in the preparation of a spelter bath, then heating the bath to a temperature slightly below the melting point of the softer of the metals to be treated and then immersing the parts in the bath.

9. A step in the process of uniting structural parts formed of metals of different degrees of hardness consisting in relatively locating the parts and then immersing them in a non-corrosive metallic bath heated to a temperature just below the melting point of the softer metal, whereby the harder metal will become white hot and the bath material will firmly adhere to the entire surface thereof and form a molecular union with the softer metal to produce a non-corrosive and strongly resistant joinder of said metals.

10. The process of uniting structural parts formed of ferrous metals having relatively different melting points, which consists in relatively locating the parts, then immersing them in a non-corrosive metallic bath maintained at a constant temperature slightly below the critical point of the structural part having the lowest melting point to effect a substantially molecular union of said parts, and then withdrawing the united parts from said bath and permitting them to drain and cool.

11. The process of uniting structural parts formed of metals having relatively different melting points, which consists in relatively locating the parts, then immersing them in a non-corrosive metallic bath maintained at a constant temperature slightly below the critical point of the metal having the lowest melting point to effect a substantially molecular union of said parts, and then withdrawing the united parts from said bath and permitting them to drain and cool.

HAROLD A. SOULIS.
WILBUR T. SOULIS.